May 7, 1963

G. M. SWENSON 3,088,526

FOLDING MULTIPLE ROW CULTIVATOR

Filed Aug. 4, 1958

INVENTOR.
GUST M. SWENSON
BY
Williamson, Schroeder & Palmatier
ATTORNEYS

May 7, 1963  G. M. SWENSON  3,088,526
FOLDING MULTIPLE ROW CULTIVATOR
Filed Aug. 4, 1958  2 Sheets-Sheet 2

INVENTOR.
GUST M. SWENSON
BY
Williamson, Schroeder & Palmatier
ATTORNEYS

United States Patent Office 3,088,526
Patented May 7, 1963

3,088,526
FOLDING MULTIPLE ROW CULTIVATOR
Gust M. Swenson, Crookston, Minn.
Filed Aug. 4, 1958, Ser. No. 752,955
3 Claims. (Cl. 172—297)

This invention relates to a multiple row cultivator and more specifically relates to apparatus attachable to a tractor for mounting a plurality of cultivator spades or the like which may be arranged to simultaneously cultivate several rows of crops, or on the alternative may be arranged in such a position as to permit driving of the tractor down a highway or the like.

An object of my invention is to provide a new and improved multiple row cultivator of relatively simple and inexpensive construction and operation.

Another object of my invention is to provide a novel multiple row cultivator attachable to a tractor and foldable from extended position forwardly to a position of small compass wherein the cultivator spades or the like are disposed in inoperative position so as to adapt the tractor with the attachment thereon to travel along a highway.

Still another object of my invention is to provide an improved and novel multiple row tractor-mounted cultivator attachment with several cultivator mounting sections which are foldable into a position of small compass, and wherein the vertical positions of the several sections are jointly controlled when the attachment is in extended or operative position and wherein the vertical position of the several sections are individually controlled when in an inwardly folded or highway position.

A further object of my invention is the provision of a new and improved multiple section cultivator which is mountable upon a tractor and which has a plurality of rows of cultivator spades which are all maintained at identical vertical positions with respect to the ground surface.

These and other objects and advantages of my invention will more fully appear from the following description made in connection with the accompanying drawings wherein like reference characters refer to the same or similar parts throughout the several views and in which.

Figure 1:
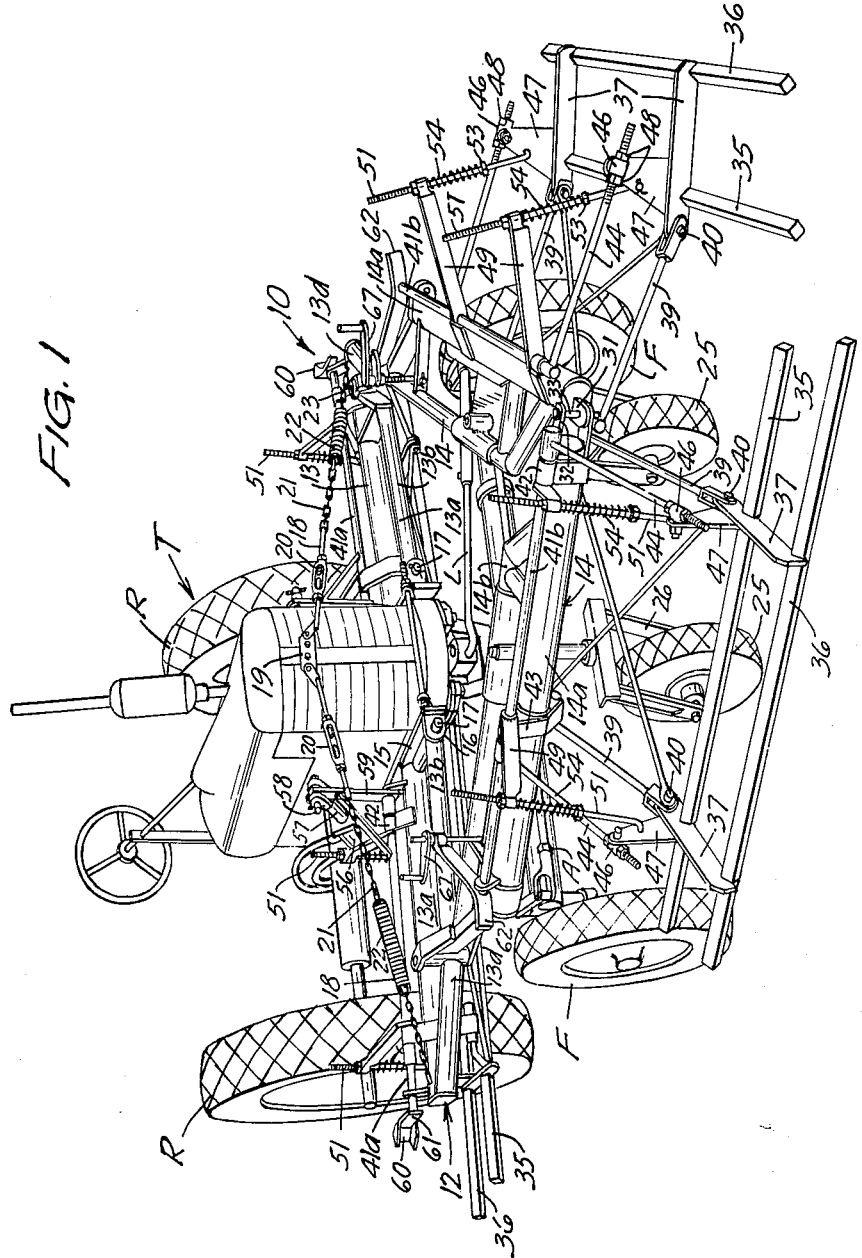
FIG. 1 is a perspective view of the present invention shown attached to a tractor and shown in forwardly and inwardly swung position.

One form of the present invention is shown in the drawings and is described herein.

A multiple row tractor attachment is indicated in general by numeral 10 and is shown attached to a tractor T which has its rear wheels R and front wheels F spread outwardly from each other so as to be in fore-and-aft alignment with each other for traveling between crop rows. The front wheels of the tractor are on a substantially conventional axle structure A and are directionally controlled by a conventional steering apparatus which includes a link L from the tractor to one end of the axle structure A.

Figure 2:
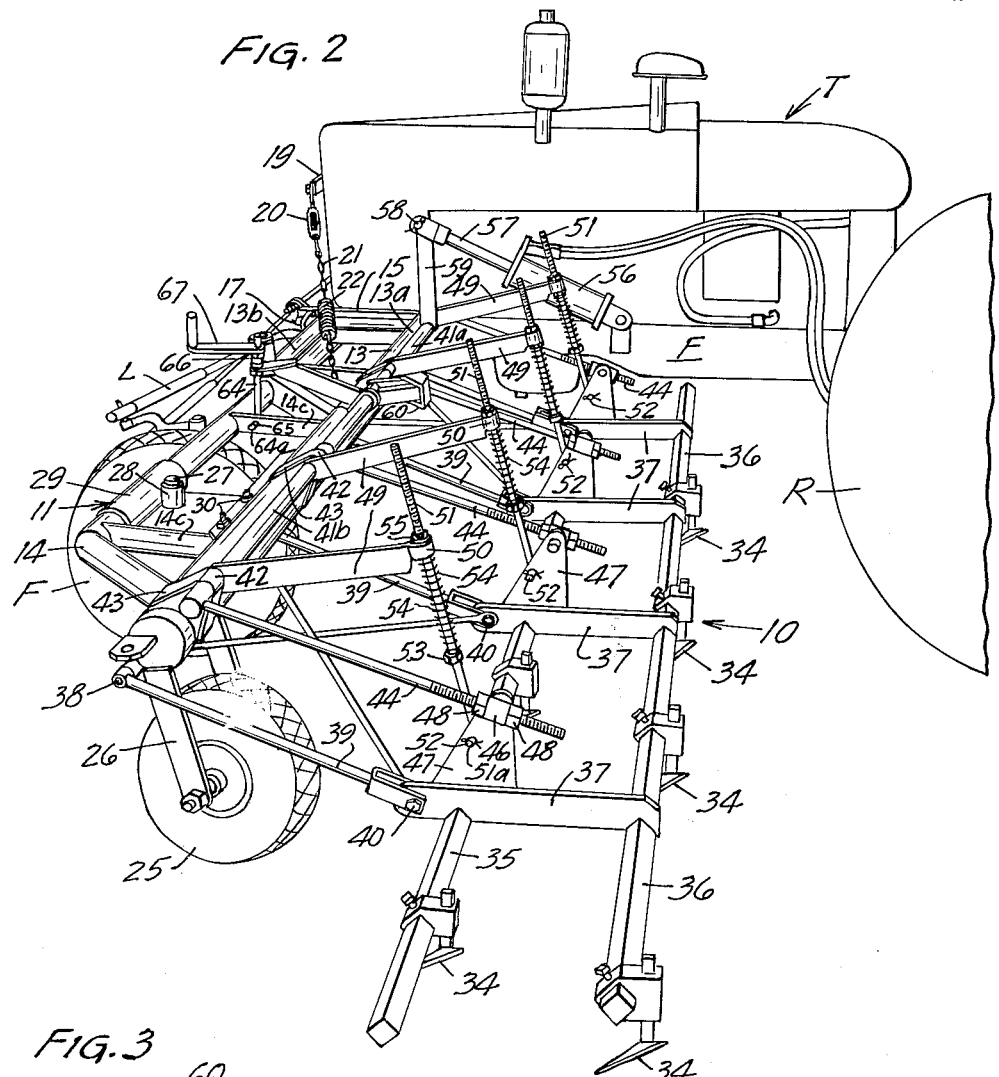
FIG. 2 is a perspective view showing the attachment at one side of the tractor in extended position for cultivating a multiplicity of rows of crops.
Figure 3:
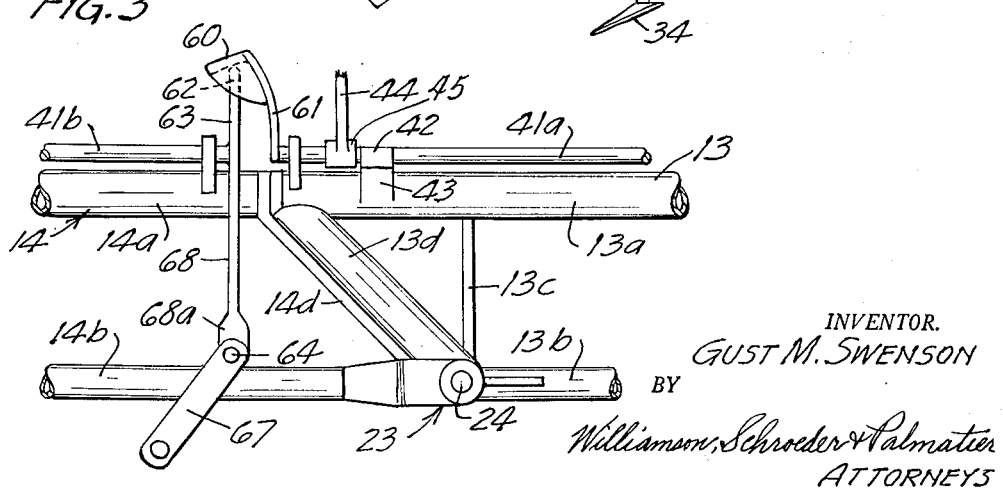
FIG. 3 is a top plan detail view of the interconnecting portion of the inner and outer sections of one of the frame structures.

The multiple row cultivator attachment 10 includes a pair of transversely outwardly projecting frame structures respectively indicated in general by numerals 11 and 12. Each of the frame structures are substantially identical with each other, and a detailed understanding of the frame structure 11 as shown in FIG. 2 will give a complete understanding of the entire attachment 10. Each of the frame structures 11 and 12 has an inner frame section 13 and an outer frame section 14. The inner frame section 13 has a pair of elongate and parallel rigid frame members 13a and 13b respectively which are spaced from each other in a fore-and-aft direction and which are interconnected by means of a cross brace 13c and by means of a diagonal frame element 13d which extends between the outer ends of the frame members 13a and 13b, it being noted that the frame member 13a extends outwardly beyond the end of frame member 13b.

Means are provided for securing the inner frame section 13 to the tractor frame F so as to permit upward and downward swinging oscillation of the frame structures 11 and 12 with respect to the tractor. In the form shown, such means include a pair of rigid brackets 15, each secured to a respective side of the tractor frame F adjacent the front end thereof and having apertured ears 16 through which extend the pivot shaft 17 of the respective frame structure, which shaft 17 is affixed to the inner frame section 13 and specifically to the rigid frame members 13a and 13b thereof. Means are also provided for normally maintaining the frame structures 11 and 12 in a substantially horizontal position and in the form shown, such means include a pair of resilient connections 18 between a bracket 19 on the tractor T and the outer ends of the inner frame sections 13. More specifically, each of the resilient connections 18 includes a length-adjusting turnbuckle 20, a length of chain 21 with a tension spring 22 interposed therein for allowing limited downward movement of the inner section.

Each of the outer sections 14 is also provided with a pair of elongate, rigid frame members 14a and 14b respectively which are normally disposed in alignment with the rigid frame members of the inner frame section 13 and are disposed in end-to-end relation therewith. The rigid frame members 14a and 14b are also affixed together by rigid cross struts 14c and by a rigid diagonal frame element 14d which lies parallel to and in engagement with the diagonal 13d of the inner frame section 13.

Means are provided for swingably interconnecting the inner and outer frame sections to permit forward and inward swinging of the outer frame sections 14 with respect to the inner frame sections 13. In the form shown, such means comprise a swinging joint 23 including a vertical pivot 24 for connecting the adjacent and aligned ends of the foremost frame members 13b and 14b of the inner and outer frame sections respectively.

Caster wheels 25 are provided for supporting the outer frame sections from the ground and it will be seen that the caster wheels 25 are secured through a suitable yoke structure 26 and a spindle 27 to a bracket 28 which is secured to the outer frame section 14 by means of a sleeve 29 which is slidable along the front frame element 13b to provide adjustability as to the position of the caster along the length of the outer frame section, and the bracket 28 is also secured by a pair of bolts 30 to a flange which is rigid with the rear frame member 13a.

Interfitting means are provided on the outer ends of the respective outer frame sections 14 and are adapted to be secured together when the outer frame sections are swung forwardly and inwardly into the position shown in FIG. 1. Such means comprise a tongue 31 rigidly affixed to the outer end of one of the frame members 14a and a pair of ears 32 affixed to the outer end of the other rigid frame member 14a. The ears 32 and tongue 31 are apertured to receive a pin or bolt 33 therethrough for holding the outer frame sections 14 in forwardly and inwardly swung position.

Means are provided on each of the frame structures 11 and 12 and more specifically on the inner and outer sections 13 and 14 thereof for vertically adjustably mounting a plurality of cultivator spades 34. In the form shown, such means comprise a pair of horizontal mounting bars 35 and 36 disposed adjacent each of the frame sections 13 and 14. The bars 36 of the inner and outer sections are normally disposed in substantial alignment with each other as are the bars 35 of the inner and outer sections. The bars 35 and 36 are rigidly affixed together by cross braces 37 and are connected to the frame sections by suitable means for maintaining the mounting bars at predetermined orientation with respect to the ground surface so that when the bars are raised and lowered, all of the cultivator spades have identical positions with respect to the ground surface. Each of the inner and outer frame sections 13 and 14 has a shaft 38 thereon for swingably mounting links 39 which are pivotally connected by pins or bolts 40 to the bracing elements 37. The inner and outer frame sections also have aligned control shafts 41a and 41b respectively journalled thereon in bearings 42 which are affixed as by straps or brackets 43 to the rear frame members 13a and 14a. Links 44 have sleeves 45 on their inner ends which are rotatably mounted on shaft sections 41a and 41b to permit the link 44 to swing with respect to the shaft. The outer ends of links 44 are threaded, and slidably extend through rotating sleeves 46 which are pivoted to rigid standards 47 affixed to the cross braces 37. Nuts 48 are threaded on the end of link 44 and bear against the sleeve 46 to maintain the sleeve 46 in a predetermined position along the link 44. It will be noted that links 44 and 39 are parallel and it is specifically pointed out that imaginary lines extending between the pivots 40 and sleeves 46 are parallel to such lines extending between the rotation axes of shafts 38 and shaft sections 41a and 41b so that mounting bars 35 and 36 are maintained at identical heights with respect to the ground surface at all times.

Vertical positions of the bars 35 and 36 are controlled by rotary oscillation of the shafts 41a and 41b to which are affixed rearwardly extending arms 49 having collars 50 at the outer ends thereof through which rods 51 slidably extend. The lower ends 51a of rods 51 are pivoted in the upright standards 47 and are retained therein as by pins 52. Collars 53 are fixed on rods 51 and bear against the lower ends of compression springs 54, the upper ends of which bear against the collars 50. Adjustable collars 55 which are normally affixed by set screws bear downwardly against the upper sides of collars 50 to limit the movement of rod 51 through the collars 50. It will therefore be seen that by rotatably oscillating the shafts 41a and 41b, the mounting bars 35 and 36 may be raised and lowered. It should further be pointed out that if the cultivator spades engage an obstruction and move upwardly, the mounting bars 35 and 36 are permitted to move upwardly with respect to arms 49 by causing compression of the springs 54 and upward sliding of the rod 51 through the collar 50.

Means are provided for controlling the rotary oscillation of the shafts 41a and 41b with respect to each other for controlling the vertical positioning of the cultivator mounting bars 35 and 36.

In the form shown, such means include a hydraulic ram or cylinder 56 with one end secured to the tractor frame F and with the outer end of the piston rod 57 connected by means of a pivot 58 to a rigid arm 59 which is affixed as by welding to the inner end of shaft 41a.

Means are provided for releasably interconnecting the ends of shafts 41a and 41b which are disposed in end-to-end relation with each other. In the form shown, such means include a transversely outwardly opening socket 60 mounted on a substantially rigid arm 61 which is affixed to the shaft 41a and a rigid insert 62 which comprises the outer end portion of a rigid bar 63 affixed as by welding to the end of shaft 41b. It will therefore be seen that when the socket and insert are in coupled condition, operation of the hydraulic ram 56 causes rotation of shaft 41a which rotary movement is transmitted to the outer shaft 41b, for swinging the arms 49 and raising and lowering the mounting bars 35 and 36.

Means which are movable into and out of operative position are provided for controlling rotary oscillation of the shaft 41b and for controlling vertical movement of the mounting bars 35 and 36 when the outer frame sections 13 and 14 are swung forwardly and inwardly into the position shown in FIG. 1. In the form shown, such means comprise an upright threaded rod 64 on each of the outer frame sections 14 and having its lower end 64a bent at right angles and inserted through an aperture 65 in a cross brace 14c adjacent the inner end of the outer section 14. The lower end 64a of the rod is retained in the apertures 65 by means of a cotter pin or the like and the upper threaded end of rod 64 has a nut 66 threaded thereon and welded to a crank handle 67. A rigid arm 68 is affixed as by welding to the shaft 41b and has a bifurcated outer end 68a which defines a yoke to slide up and down along the rod 64.

In operation for cultivating a field, the attachment will normally be in the position shown in FIG. 2 wherein the outer frame sections are disposed in alignment with the inner frame sections. It will be noted that the ends of frame members 13a and 14a are abutted together in end-to-end relation and the diagonal frame elements 13d and 14d engage each other in side-by-side relation. When the apparatus is in the operative condition shown in FIG. 2, the crank handle 67 is revolved so to move the nut 66 well above the bifurcated end 68a of the rigid control arm 68 so that the shaft 41b is free to rotatably oscillate when the power cylinder 56 is operated. Of course the power cylinder 56 is connected to the conventional hydraulic system of the tractor and is operated by suitable valves. When the piston rod of the hydraulic cylinder is retracted, the shafts 41a and 41b are simultaneously revolved to lower the cultivator bars 35 and 36 which are maintained at equal heights above the ground. As the tractor is moved along the field, the caster wheels 25 support the outer frame sections so that the cultivating operation at the various sections of the apparatus is uniform. If the cultivator spades should engage a rock or other solid object in the ground, the mounting bars 35 and 36 of one section are permitted to move upwardly as the cultivator spade passes over the object. When the upward force is exerted, the rods 51 slide up through the sleeve 50 and the compression spring 54 is compressed.

Subsequently, the spring 54 will urge the cultivator mounting bars and the cultivator spades down to their normal positions until the collar 55 engages the sleeve 50.

When the work in a certain field has been completed, it may be desired to transport the cultivator and tractor along a highway to another field. In order to facilitate travel along a highway, the outer frame sections will be swung forwardly into the position shown in FIG. 1. In order to accomplish this forward and inward swinging of the outer frame sections, the crank handle 67 is rotated to move the nut 66 downwardly along the threaded rod 64 until the nut engages the bifurcated end 68a of the control arm 68. The outer frame section may then be moved forwardly and inwardly and the nut 66 on rod 64 will prevent the shaft 41b from rotating under the influence of the weight of the mounting bars 35 and 36 and of the cultivator spades. If desired, the cultivator spades may actually be lifted further off the ground by screwing the nut 66 further down along the rod 64. When the outer frame sections have been swung forwardly, the interfitting tongue and ears 31 and 32 respectively of the opposite ends of the frame sections will be interfitted with respect to each other and the pin 33 will be dropped into place so as to hold the outer frame sections in inwardly swung position. Of course the caster wheels will continue to support the outer frame sections when in their forwardly swung positions.

By reversing this general procedure the outer frame sections may subsequently be swung outwardly into operative condition. It may be found necessary to adjust the nut 66 along the rod 44 in order to cause the insert 62 to slip freely into the socket 60. When the insert and socket have been coupled, the nut 66 may be turned and moved upwardly along the rod 64 out of engagement with the arm 68 and into inoperative position so that the power cylinder 56 may entirely control the vertical positioning of the mounting bars and cultivator spades.

It will, of course, be understood that various changes may be made in the form, detail, arrangement and proportion of the parts without departing from the scope of my invention which consists of the matter described herein and set forth in the appended claims.

What I claim is:

1. A cultivator attachment for a tractor, comprising a pair of sectionalized frame structures attachable to the tractor to extend laterally outwardly therefrom, each of said frame structures having an inner section attached to the tractor and an outer section, said sections having rigid elongate frame members spaced from each other in a fore-and-aft direction, the frame members of the inner and outer sections being disposed in alignment with each other, means pivotally connecting the foremost frame members of the inner and outer sections together, the rearmost frame members of the inner sections extending outwardly beyond the ends of the foremost frame members of the inner sections and said last mentioned rearmost frame members abutting the corresponding rearmost frame members of the outer sections in end-to-end relation, each of the frame structures having a pair of rigid and parallel diagonal frame elements engaging each other in side-by-side relation and extending diagonally between the end of the frame members of the inner and outer sections respectively adjacent the pivot means, said diagonal frame elements preventing rearward swinging of the outer sections and permitting forward swinging thereof, and means on said sections for vertically adjustably mounting a plurality of cultivator spades.

2. A cultivator attachment for a tractor, comprising a pair of sectionalized frame structures attachable to the tractor to extend laterally outwardly therefrom, each of the frame structures having an inner section attached to the tractor and having an outer section, means connecting the outer section to the inner section and permitting forward and inward swinging of the outer section, each of the sections having thereon vertically movable cultivator-mounting means supported thereon, the inner and outer sections having aligned shafts extending therealong and journalled thereon in end-to-end relation with each other, means affixed to said shafts for vertically moving the cultivator mounting means when the shafts are rotated, control means on the tractor for rotating the shaft on the inner section of the frame structure, one of the shafts having a rigid insert laterally spaced from its rotation axis and the other of the shafts having a rigid insert-receiving socket opening toward the other shaft and permitting the insert to be removed and inserted, said insert and socket causing said shafts to rotate in unison for controlling the cultivator mounting means on the inner and outer frame section, and additional means for holding the outer shaft against rotation when the cultivator-mounting means of the outer section are raised and the outer section is swung forwardly.

3. The invention set forth in claim 2 and said additional means including a screw secured to the outer section in spaced relation with the shaft of the outer section and extending transversely of the shaft, a rigid abutment affixed to the shaft and disposed adjacent the screw, and a movable control element threaded on the screw and engaging said abutment to prevent movement of the abutment along the screw and thereby prevent rotation of the shaft when the outer frame section is swung forwardly, the control element being movable along the screw out of engagement with the abutment to permit rotary oscillation on the outer section to be controlled through the insert and socket.

References Cited in the file of this patent

UNITED STATES PATENTS

| | | |
|---|---|---|
| 1,872,314 | McCormick | Aug. 16, 1932 |
| 1,927,458 | Klise | Sept. 19, 1933 |
| 2,269,344 | Nelson | Jan. 6, 1942 |
| 2,828,597 | Moore | Apr. 1, 1958 |